US007085645B2

(12) United States Patent
Matsuda et al.

(10) Patent No.: US 7,085,645 B2
(45) Date of Patent: Aug. 1, 2006

(54) ENGINE SPEED CONTROL SYSTEM FOR SNOW REMOVER

(75) Inventors: Hayato Matsuda, Wako (JP); Tomoki Fukushima, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 7 days.

(21) Appl. No.: 11/036,399

(22) Filed: Jan. 14, 2005

(65) Prior Publication Data

US 2005/0154524 A1 Jul. 14, 2005

(30) Foreign Application Priority Data

Jan. 14, 2004 (JP) ............................ 2004-007380

(51) Int. Cl.
*G06F 7/00* (2006.01)
*F02D 9/00* (2006.01)
*G05D 1/00* (2006.01)

(52) U.S. Cl. ....................... 701/110; 701/114; 123/478; 123/350

(58) Field of Classification Search ................ 701/110, 701/114, 103, 104; 123/350, 352, 478
See application file for complete search history.

(56) References Cited

U.S. PATENT DOCUMENTS 5,462,031 A * 10/1995 Kai ............................ 123/478
2005/0154521 A1* 7/2005 Katsuragawa et al. ...... 701/101

FOREIGN PATENT DOCUMENTS

JP 2001-020238 1/2001
JP 2002-316575 A * 10/2002

* cited by examiner

*Primary Examiner*—Hieu T. Vo
(74) *Attorney, Agent, or Firm*—Carrier, Blackman & Associates, P.C.; Joseph P. Carrier; William D. Blackman

(57) ABSTRACT

In an engine speed control system for a snow remover, the engine speed is controlled at the desired speed by driving the throttle valve with an electric motor, the engine output power corresponding to the load acting on the snow removal mechanism or travel mechanism is estimated based on the throttle position and the engine speed, and the desired speed is increased in stepwise fashion to a higher value when the estimated engine output power exceeds first through third ascending threshold values. With this, the engine speed maintained when a small load is acting on the snow removal mechanism or travel mechanism can be set to a lower value, whereby the noise level can be reduced and fuel efficiency improved compared with the prior art wherein a mechanical governor is used to adjust the engine speed.

16 Claims, 6 Drawing Sheets

ENGINE SPEED CONTROL SYSTEM FOR SNOW REMOVER

BACKGROUND OF THE INVENTION

1. Field of the Invention

The present invention relates to an engine speed control system for a snow remover.

2. Description of the Related Art

Widely known in conventional practice are snow removers in which an internal combustion engine is mounted, a snow removal mechanism (such as auger or blower) is driven with the engine, and a travel mechanism (such as crawler) is also driven by the engine to allow the snow remover to be self-propelled, for example, as taught in Japanese Laid-Open Patent Application No. 2001-20238.

In snow removers wherein a snow removal mechanism or a travel mechanism is driven by the engine, a throttle valve is conventionally opened and closed by a mechanical governor in response to the engine load, whereby the engine speed is controlled so as to reach the desired speed.

The mechanical governor operates so as to maintain a constant engine speed (specifically, the desired speed) by means of the balance between a load generated by a flyweight and the elastic force of a spring. Therefore, it has been impossible to set the desired speed during a high engine load (high load acting on the snow removal mechanism or travel mechanism) to a level above the speed during a low engine load (low load acting on the snow removal mechanism or travel mechanism). Therefore, conventional snow removers have been disadvantageous in that the engine speed increases as the load acting on the snow removal mechanism or travel mechanism decreases, more noise is generated, and more fuel is consumed.

Also, in snow removers based on the prior art, when the engine speed (engine output power) is either too high or too low relative to the load (in other words, the snow quality or the amount of accumulated snow) acting on the snow-removal mechanism or travel mechanism, the user is compelled, based on experience, to manually vary the mechanical governor setting and adjust the engine speed. Accordingly, the operation becomes more complex, and load generating operations such as snow removal and driving become more difficult to perform in a stable manner.

SUMMARY OF THE INVENTION

Therefore, an object of the present invention is to solve the problems described above and to provide an engine speed control system for a snow remover that is configured such that the engine speed can be lowered and the noise level reduced when the load acting on the snow removal mechanism or travel mechanism is low, fuel efficiency can be improved, the operation can be simplified without the need to manually adjust the engine speed, and load generating operations such as snow removal and driving can be performed in a stable manner.

In order to achieve the object, there is provided a system for controlling a speed of an internal combustion engine mounted on a snow remover having a snow removal mechanism and a travel mechanism to drive at least one of the snow removal mechanism and travel mechanism, comprising: an actuator connected to a throttle valve of the engine to move the throttle valve; an engine speed sensor detecting speed of the engine; a throttle position sensor detecting position of the throttle valve; an engine speed controller controlling operation of the actuator such that the speed of the engine becomes equal to a desired engine speed; a load estimator estimating load acting on at least one of the snow removal mechanism and travel mechanism based on the detected speed of the engine and position of the throttle valve; and a desired engine speed changer changing the desired engine speed to increase when the estimated load exceeds an ascending threshold value.

BRIEF DESCRIPTION OF THE DRAWINGS

The above and other objects and advantages of the invention will be more apparent from the following description and drawings, in which.

DESCRIPTION OF THE PREFERRED EMBODIMENT

The preferred embodiment of the engine speed control system for a snow remover according to the present invention will now be described with reference to the accompanying drawings.

Figure 1:
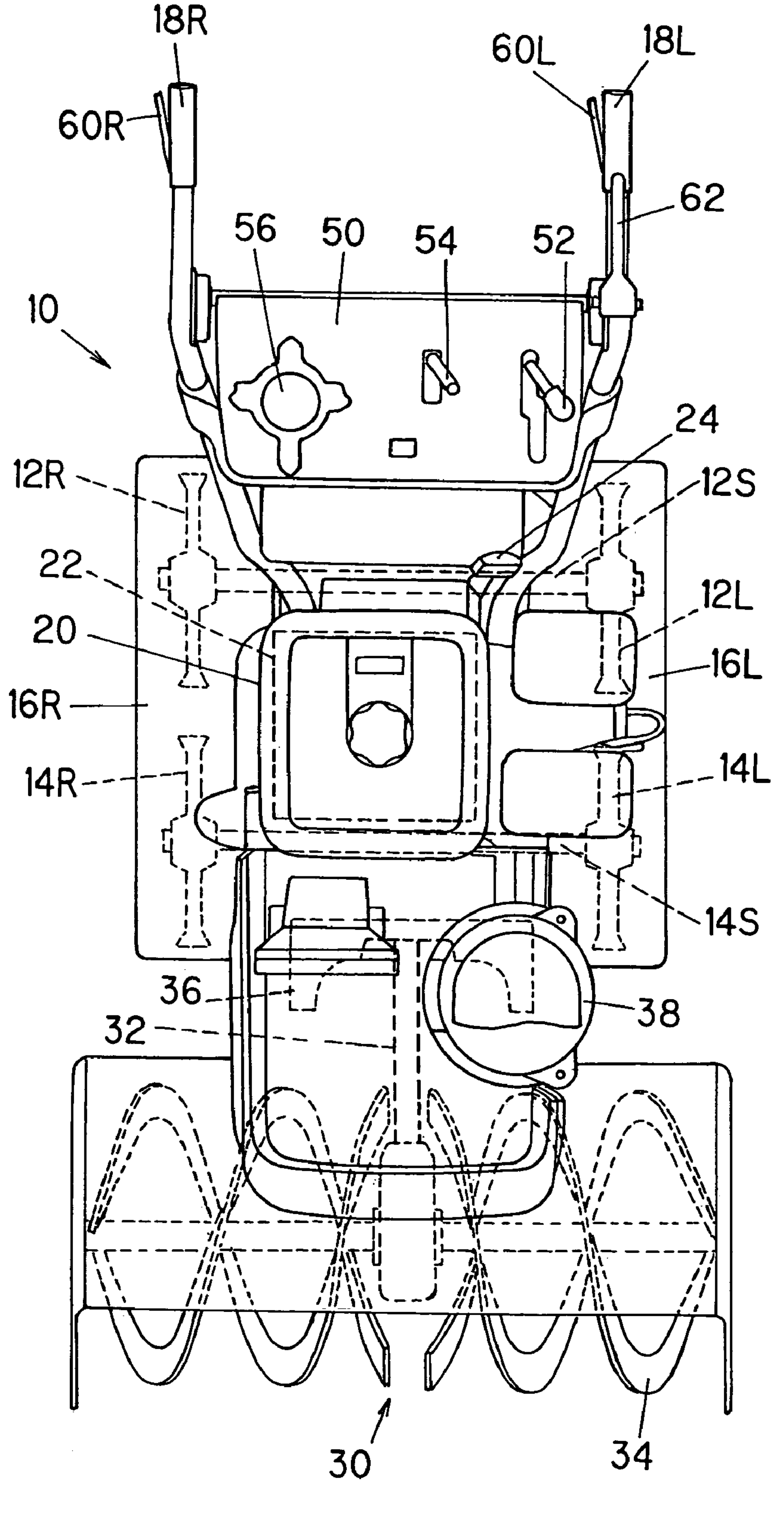
FIG. 1 is a plan view of a snow remover equipped with engine speed control system for a snow remover according to an embodiment of the present invention.
Figure 2:
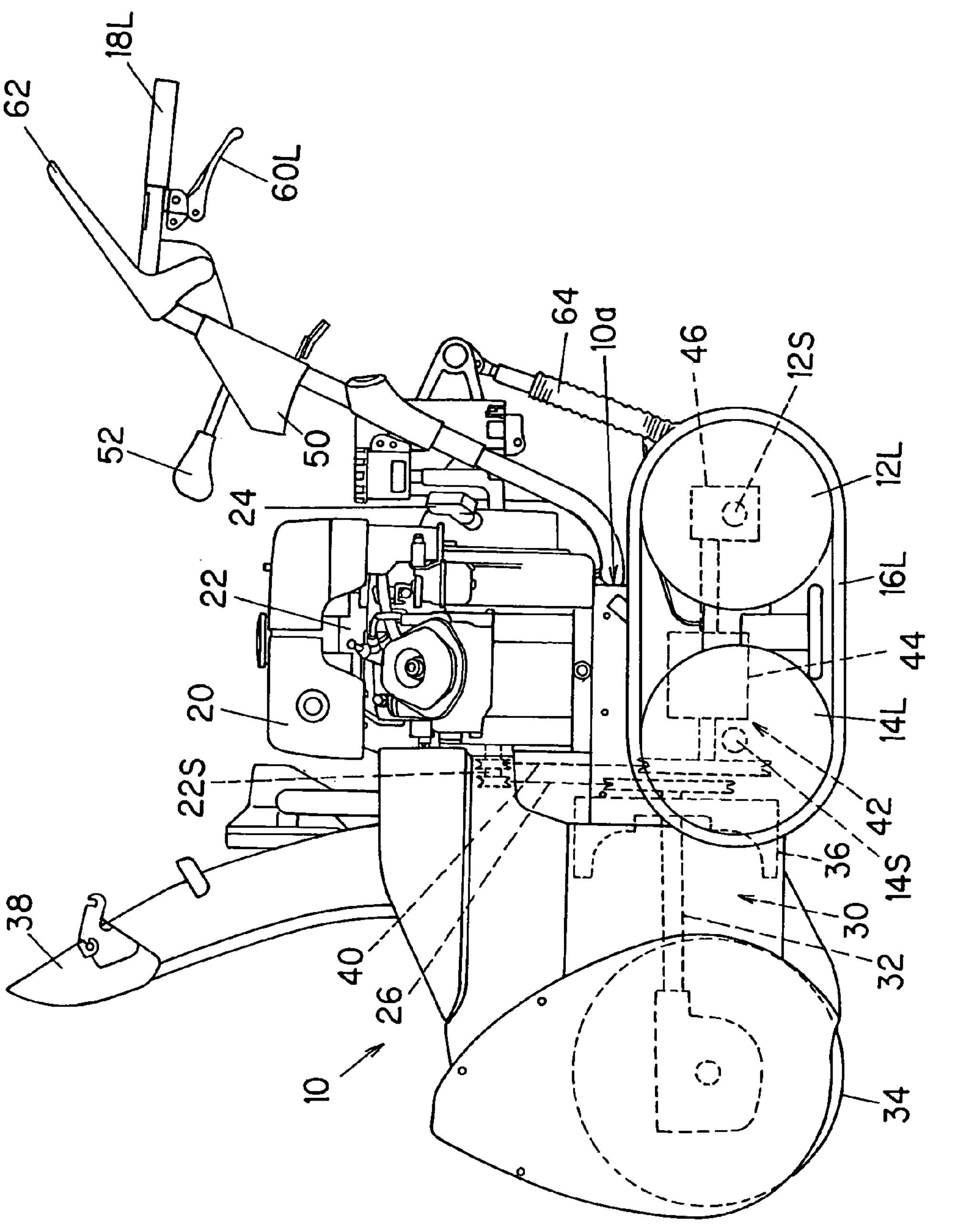
FIG. 2 is a left hand side view of the snow remover shown in FIG. 1.

FIG. 1 is a plan view of a snow remover equipped with the engine speed control system for a snow remover according to the present embodiment. FIG. 2 is a left hand side view of the snow remover shown in FIG. 1.

In FIGS. 1 and 2, reference numeral 10 indicates a snow remover. The snow remover 10 is a non-riding self-propelled snow remover that has a pair of crawlers 16L and 16R wrapped around left and right (in the direction of movement) driving wheels (rear wheels) 12L and 12R and driven wheels (front wheels) 14L and 14R, and a pair of handlebars 18L and 18R.

An internal combustion engine 22 is mounted in the interior of an engine cover 20 on top of a body frame 10*a* of the snow remover 10. The engine 22 has a recoil starter 24, and is manually started by the operator.

A crankshaft 22S of the engine 22 is connected to a snow removal mechanism 30 provided near the distal end of the body frame 10*a* via a first belt 26 wound around a pulley, as shown in FIG. 2. The snow removal mechanism 30 has a rotating shaft 32 to which the rotational output of the engine 22 is transmitted by the first belt 26, and an auger 34 and a blower 36 attached to the rotating shaft 32. A shooter 38 is provided above the blower 36.

The crankshaft 22S of the engine 22 is also connected to a travel mechanism 42 via a second belt 40 wound around a pulley. The travel mechanism 42 has a transmission 44 to which the rotational output of the engine 22 is transmitted by the second belt 40, a differential mechanism 46 connected to the transmission 44, driving wheels 12L and 12R connected to the differential mechanism 46 via an axle 12S, driven wheels 14L and 14R, and crawlers 16L and 16R. The axle 12S of the driving wheels 12L and 12R and the axle 14S of the driven wheels 14L and 14R are rotatably supported by a travel frame (not shown).

An operating panel 50 is provided between the left and right handlebars 18L and 18R. The operating panel 50 has a speed control lever 52, an auger height control lever 54, and a shooter direction control lever 56. Turning levers 60L and 60R are provided below the left and right handlebars 18L and 18R, and a travel lever 62 is provided above the left handlebar 18L.

Next, the travel operation and snow removal operation of the snow remover 10 will be briefly described.

When the operator grasps the travel lever 62, a deadman clutch (not shown) disposed in the middle of the power transmission path of the travel mechanism 42 begins transmitting power, whereby the rotational output of the engine 22 is transmitted to the crawlers 16L and 16R and the snow remover 10 begins to move. As a result of operating the speed control lever 52, the transmission ratio of the transmission 44 varies, or the throttle valve of the engine 22 is opened or closed by an electric motor (described later) to vary the engine speed, whereby the travel speed of the snow remover 10 is adjusted.

Furthermore, grasping either of the left and right turning levers 60L and 60R causes a braking mechanism (not shown) to operate and reduce the rotating speed of the corresponding crawler, whereby the snow remover 10 is turned.

The auger 34 is driven by the rotational output of the engine 22, whereby snow in front of the snow remover 10 is scraped in behind the auger 34. The snow scraped in by the auger 34 is propelled upward by the blower 36 and expelled in the desired direction via the shooter 38. The orientation of the distal end (outlet) of the shooter 38 is configured so as to be adjustable by operating the shooter direction control lever 56. A cylinder 64 (shown in FIG. 2) can be expanded and contracted to adjust the angle of the body frame 10*a* relative to the travel frame by operating the auger height control lever 54, whereby the height of the auger 34 from the ground surface can be adjusted. Thus, the engine 22 is mounted on the snow remover 10 having the snow removal mechanism 30 and the travel mechanism 42 to drive at least one, often both, of the snow removal mechanism 30 and travel mechanism 42.

Figure 3:
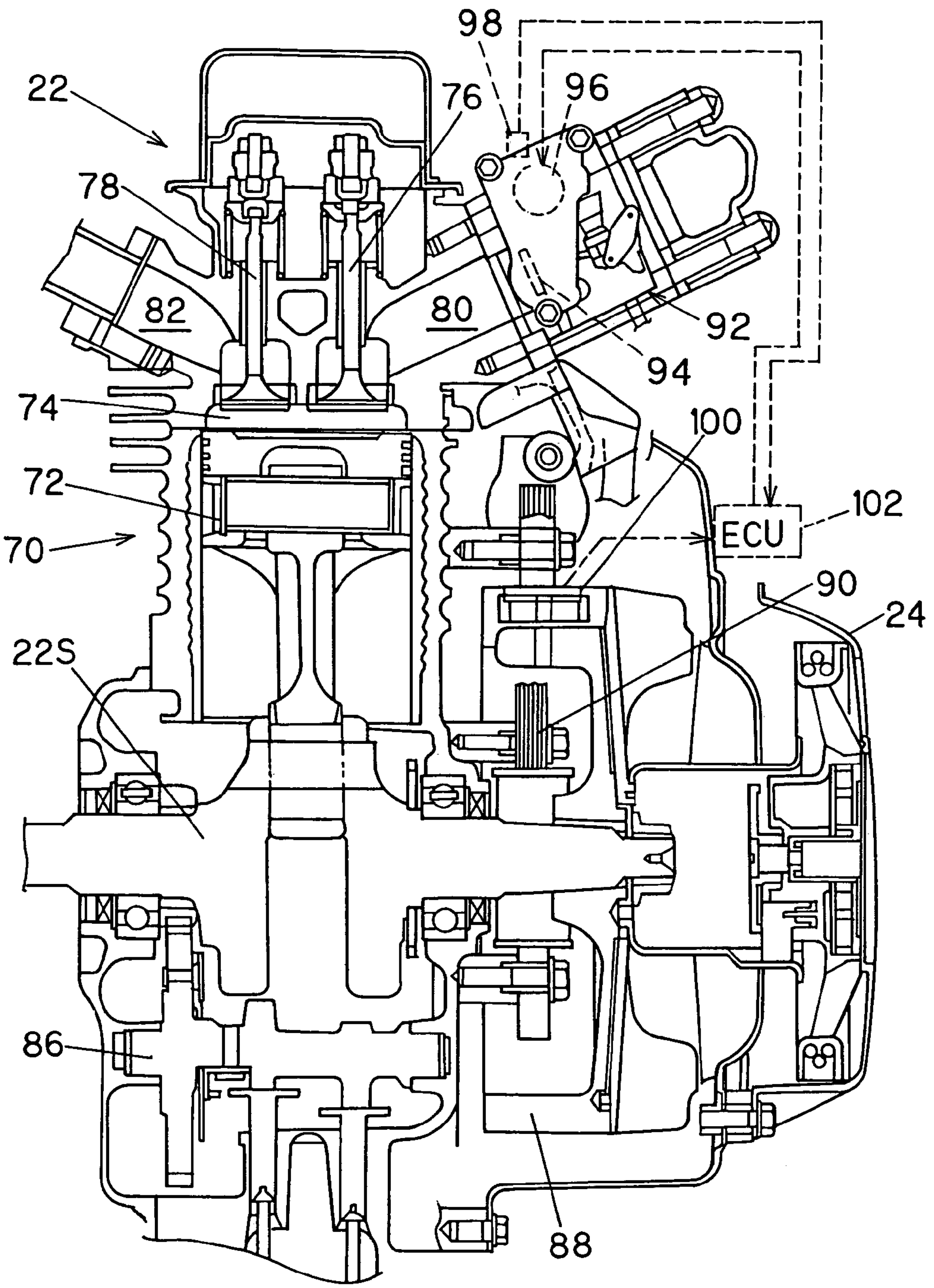
FIG. 3 is an explanatory cross-sectional view of an internal combustion engine shown in FIG. 1.

FIG. 3 is an explanatory cross-sectional view of the engine 22.

The engine 22 has a single cylinder 70, and a piston 72 is reciprocatingly accommodated therein. A combustion chamber 74 is formed between the head of the piston 72 and the cylinder wall, an intake valve 76 and an exhaust valve 78 are disposed on the cylinder wall, and the space between the combustion chamber 74 and an intake pipe 80 or an exhaust pipe 82 is opened or closed. The engine 22 is specifically an air-cooled four-cycle single-cylinder OHV engine with a 163 cc displacement.

The piston 72 is linked to the crankshaft 22S, and the crankshaft 22S is linked to a camshaft 86 via a gear. A flywheel 88 is attached to one end of the crankshaft 22S, and the recoil starter 24 is attached to the distal end side of the flywheel 88. A power-generating coil (alternator) 90 is disposed on the inner side of the flywheel 88 to generate an alternating current. The alternating current generated by the power-generating coil 90 is converted to a direct current via a processing circuit (not shown), and is then supplied as the operating power source to an ECU (Electronic Control Unit; described later), an ignition circuit (not shown), or the like.

Also, a throttle body 92 is disposed upstream of the intake pipe 80. The throttle valve (now assigned with reference numeral 94) is accommodated in the throttle body 92, and the throttle valve 94 is connected to an electric motor 96 (actuator; specifically, a stepping motor) via a throttle axle and a reduction gear mechanism (neither is shown). A carburetor assembly (not shown) is provided upstream of the throttle valve 94 in the throttle body 92. The carburetor assembly is connected to a fuel tank (not shown) and is used to spray gasoline fuel into the suctioned air in response to the position of the throttle valve 94 to form an air-fuel mixture. The air-fuel mixture thus formed is suctioned into the combustion chamber 74 of the cylinder 70 through the throttle valve 94, the intake pipe 80, and the intake valve 76.

A throttle position sensor 98 is disposed near the electric motor 96, and the sensor outputs a signal corresponding to the position or opening θTH (hereinbelow referred to as “throttle position”) of the throttle valve 94. A crank angle sensor 100 comprising an electromagnetic pickup is disposed near the flywheel 88, and the sensor outputs a pulse signal for each specific crank angle. The outputs from the throttle position sensor 98 and crank angle sensor 100 are inputted to the ECU (now assigned with reference numeral 102). The ECU 102 has a microcomputer with a CPU, ROM, RAM, and counter, and is disposed at a suitable location in the snow remover 10.

The ECU 102 counts output pulses from the crank angle sensor 100 to detect or determine the engine speed NE. The ECU 102 calculates the current supply command value of the electric motor 96 such that the engine speed NE becomes equal to the predetermined desired speed NED on the basis of the detected engine speed NE and throttle position θTH, and also outputs the calculated command value to the electric motor 96 to control its operation.

Thus, the snow remover 10 according to this embodiment is designed such that the throttle valve 94 is opened and closed by the electronically controlled throttle device (electronic governor) that has the throttle body 92, the ECU 102, and the various sensors, and the engine speed NE is controlled so as to reach the desired speed NED by controlling the amount of air intake in the engine 22.

Figure 4:
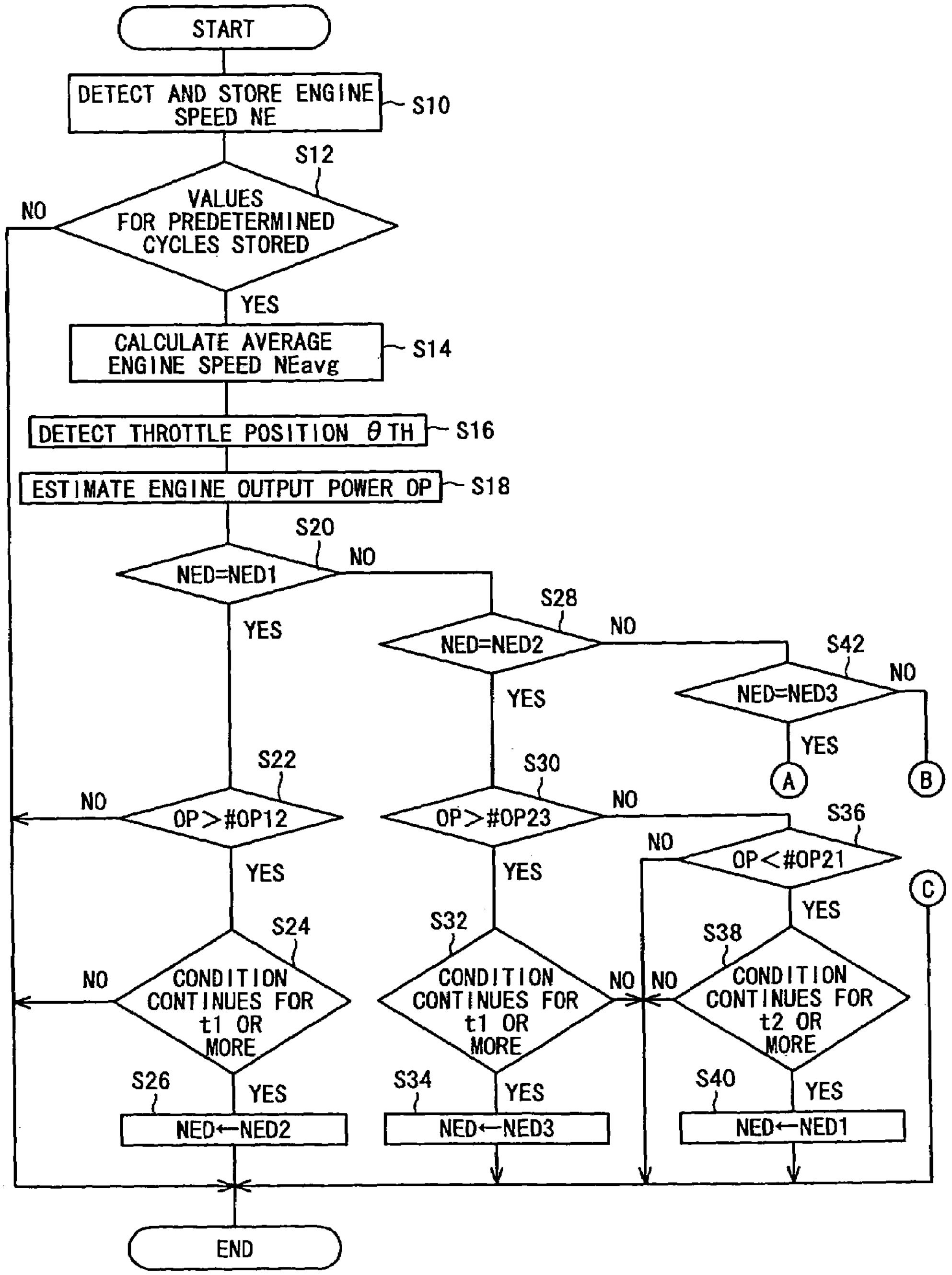
FIG. 4 is a first part of a flowchart showing the operation of the engine speed control system for a snow remover according to the embodiment.
Figure 5:
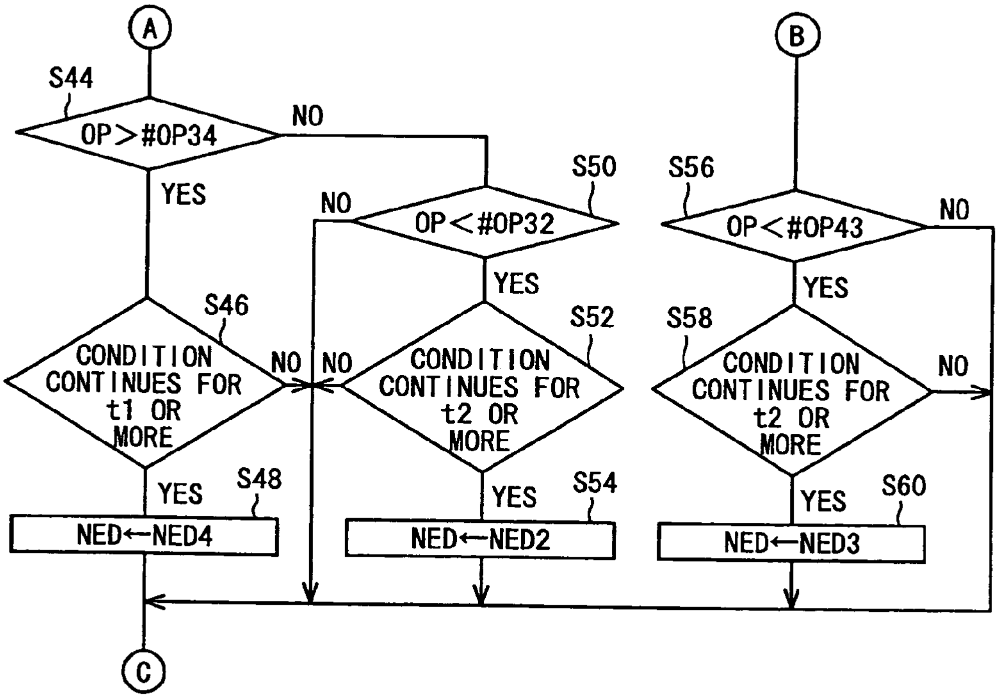
FIG. 5 is a latter part of the flowchart shown in FIG. 4.

Next, the operation of the engine speed control system for a snow remover according to the embodiment will be described with reference to FIGS. 4 and onward. FIG. 4 is the first part of a flowchart showing the operation, and FIG. 5 is the latter part. The program shown is executed at specific intervals (for example 20 msec) in the ECU 102.

First, in S10 in FIG. 4, the engine speed NE is detected and the detected engine speed NE is successively stored in the RAM of the ECU 102. Next, the program advances to S12, and it is determined whether the detected values of the engine speed NE for a predetermined number of cycles (for example, 10 cycles) have been stored. When the determination is negative in S112, the rest of the process is skipped, and when the determination is positive in S12, the program advances to S14 and the average engine speed NEavg is calculated. The average engine speed NEavg is the average value of the stored values of the engine speed NE for the predetermined number of cycles.

Next, the program advances to S16, the current value of the throttle position θTH is detected, the program further advances to S18, and the output power OP of the engine 22 is estimated. Here, the engine output power OP is a value (parameter) that indicates the engine load, and is estimated based on the average engine speed NEavg (roughly equal to the engine speed NE) and the throttle position θTH.

Figure 6:
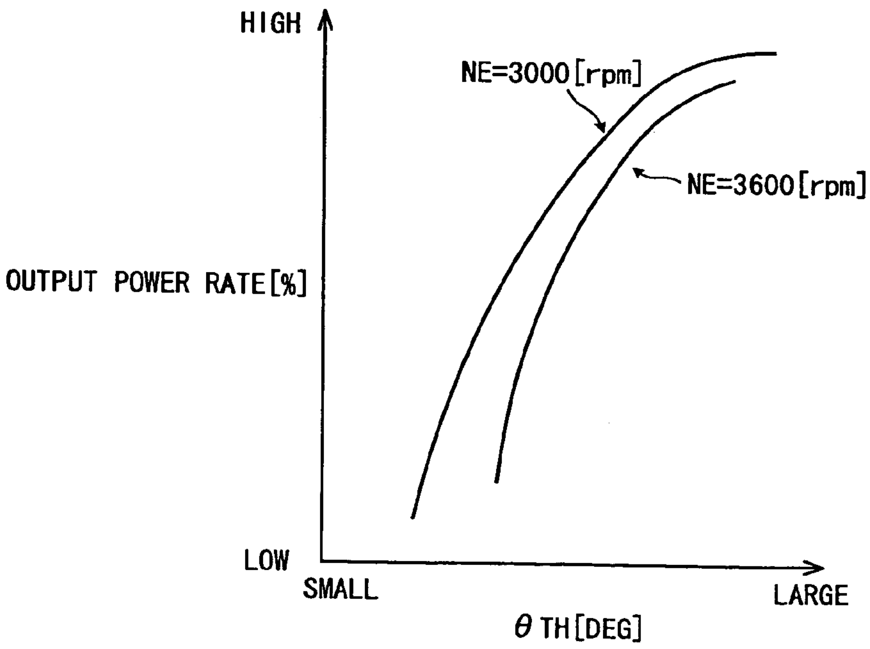
FIG. 6 is a graph showing the characteristics of output power rate of the engine relative to the throttle position θTH.
Figure 7:
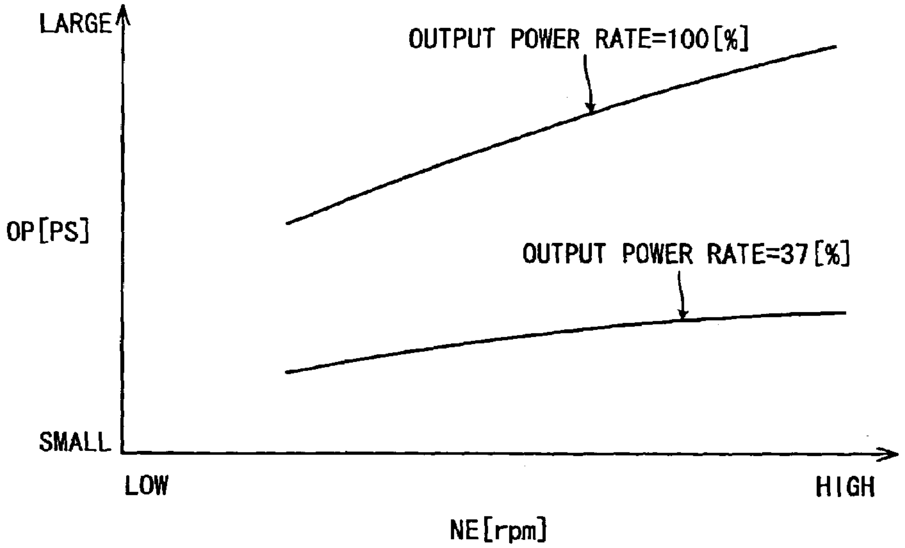
FIG. 7 is a graph showing the characteristics of output power OP of the engine relative to the engine speed NE.

To specifically describe the manner in which the engine output power OP is estimated, the characteristics of the output power rate of the engine 22 relative to the throttle position θTH vary with the engine speed NE (average engine speed NEavg), as shown in FIG. 6. The characteristics of the engine output power OP relative to the engine speed NE vary depending on the output power rate of the engine 22, as shown in FIG. 7.

Accordingly, the relationship between the engine speed NE (roughly equal to average engine speed NEavg) and the throttle position θTH can be used to estimate the corresponding engine output power OP. In view of this, in this embodiment, the engine output power OP is estimated by mapping out the relationship between the throttle position θTH and the engine output power OP for each speed in advance through experimentation, and retrieving the map on the basis of the detected (determined) engine speed NE (i.e., average engine speed NEavg) and throttle position θTH.

Estimating the engine output power OP is equivalent to estimating the load acting on the snow removal mechanism 30 or the travel mechanism 42 because when the load that acts on the snow removal mechanism 30 or travel mechanism 42 (specifically, the load on the engine 22) increases or decreases and errors or deviations occur in the engine speed NE and the desired speed NED, the ECU 102 drives the electric motor 96 to maintain the desired speed NED and adjusts the throttle position θTH (specifically, adjusts the engine output power OP).

Returning to the description of the flowchart in FIG. 4, the program then advances to S20, and it is determined whether the desired speed NED of the engine 22 is set to a first desired speed NED1 of the engine 22 (the desired speed when there is either no load (load generating operations such as snow removal and driving are not being performed) or an extremely small load; in other words, the idle speed, that is 3000 rpm in this embodiment). Since the desired speed NED is set to the first desired speed NED1 at the startup of the ECU 102, the description will continue assuming the determination herein is positive.

When the determination is positive in S20, the program then advances to S22, and it is determined whether the estimated engine output power OP exceeds a first ascending threshold value #OP12, or, in other words, whether the load acting on the snow removal mechanism 30 or the travel mechanism 42 exceeds the extremely small load. The first ascending threshold value #OP12 is set to an output power (specifically, 1.5 PS) of about 37% of the full-throttle output power (output power rate 100%) produced when the engine speed NE is at the first desired speed NED1.

When the determination is negative in S22, the rest of the process is skipped, and when the determination is positive in S22, the program advances to S24 and it is determined whether the condition that the engine output power OP exceeds the first ascending threshold value #OP12 continues over the duration of a first predetermined time period t1 (for example, 1 sec) or more. This determination is performed by starting a counter with a separate program (not shown) when the determination is positive in S22, and confirming whether the counter value has reached the first predetermined time period t1.

Figure 8:
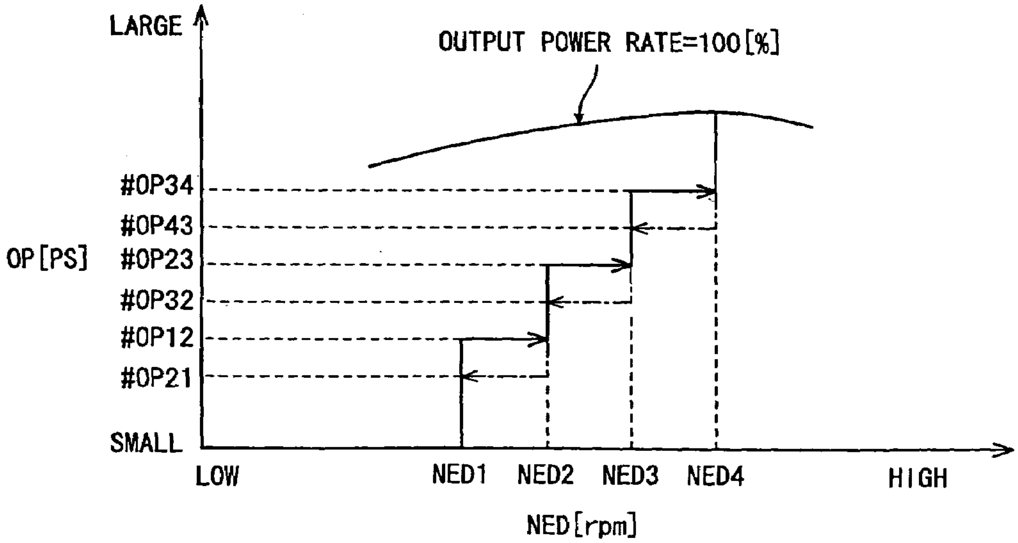
FIG. 8 is a graph showing the change of the desired engine speed NED relative to the engine output power estimated in the processing illustrated in FIGS. 4 and 5.

When the determination is negative in S24, the rest of the process is skipped and the first desired speed NED1 is maintained. When the determination is positive in S24, the program advances to S26, and the desired speed NED is changed (increased) to a second desired speed NED2 (the desired speed at a small load that is higher than the extremely small load described above; 3200 rpm in this embodiment), that is set to a higher value than the first desired speed NED1, as shown by the solid line in FIG. 8.

When the desired speed NED is changed to the second desired speed NED2 in S26, the determination is negative in S20 and the program advances to S28 when the next program is executed, and it is determined whether the desired speed NED is set to the second desired speed NED2. When the determination is positive in S28, the program advances to S30, and it is determined whether the engine output power OP exceeds a second ascending threshold value #OP23 that is set to a higher value than the first ascending threshold value #OP12; in other words, whether the load acting on the snow removal mechanism 30 or travel mechanism 42 exceeds the small load described above. The second ascending threshold value #OP23 is set to an output power (specifically, 2.5 PS) of about 57% of the full-throttle output power produced when the engine speed NE is at the second desired speed NED2.

When the determination is positive in S30, the program advances to S32, and it is determined whether the condition that the engine output power OP exceeds the second ascending threshold value #OP23 continues over the duration of the first predetermined time period t1 or more. This determination is performed in the same manner as in S24.

When the determination is negative in S32, the rest of the program is skipped and the second desired speed NED2 is maintained. When the determination is positive in S32, the program advances to S34, and the desired speed NED is changed (increased) to a third desired speed NED3 (the desired speed at a moderate load that is higher than the small load described above; 3400 rpm in this embodiment), that is set to a higher value than the second desired speed NED2, as shown by the solid line in FIG. 8.

When the determination is negative in S30, the program advances to S36, and it is determined whether the engine output power OP is less than a first descending threshold value #OP21; in other words, whether the load acting on the snow removal mechanism 30 or travel mechanism 42 is less than the small load described above. The first descending threshold value #OP21 is set to a smaller value than the first ascending threshold value #OP12. More specifically, the threshold value is set to an output power (specifically, 1.0 PS) of about 23% of the full-throttle output power produced when the engine speed NE is at the second desired speed NED2.

When the determination is negative in S36, the rest of the process is skipped and the second desired speed NED2 is maintained. On the other hand, when the determination is positive in S36, the program advances to S38, and it is determined whether the condition that the engine output power OP is less than the first descending threshold value #OP21 continues over the duration of the second predetermined time period t2 (for example, 1 sec) or more. This determination is performed in the manner similar to that in S24.

When the determination is negative in S38, the rest of the process is skipped and the second desired speed NED2 is maintained. When the determination is positive in S38, the program advances to S40, and the desired speed NED is changed (reduced) to the first desired speed NED1, as shown by the dotted line in FIG. 8.

When the determination is negative in S28, the program advances to S42, and it is determined whether the desired speed NED is set to a third desired speed NED3. When the determination is positive in S42, the processing is performed in the same manner as in steps S30 to S40.

Specifically, the program advances to S44 in the flowchart in FIG. 5, and it is determined whether the engine output power OP exceeds a third ascending threshold value #OP34 that is set to a greater value than the second ascending threshold value #OP23; in other words, whether the load acting on the snow removal mechanism 30 or travel mechanism 42 exceeds the moderate load described above. The third ascending threshold value #OP34 is set to an output power (specifically, 3.5 PS) of about 77% of the full-throttle output power produced when the engine speed NE is at the third desired speed NED3.

When the determination is positive in S44, the program advances to S46, and it is determined whether the condition that the engine output power OP exceeds the third ascending threshold value #OP34 continues over the duration of the first predetermined time period t1 or more. This determination is also performed in the same manner as in S24 above.

When the determination is negative in S46, the rest of the process is skipped and the third desired speed NED3 is maintained. When the determination is positive in S46, the program advances to S48, and the desired speed NED is changed (increased) to a fourth desired speed NED4 (the desired speed at a large load that is higher than the moderate load described above; the maximum output power generating speed of 3600 rpm in this embodiment), which is set to a higher value than the third desired speed NED3, as shown by the solid line in FIG. 8.

When the determination is negative in S44, the program advances to S50, and it is determined whether the engine output power OP is less than a second descending threshold value #OP32; in other words, whether the load acting on the snow removal mechanism 30 or travel mechanism 42 is less than the moderate load described above. The second descending threshold value #OP32 is set to a value less than the second ascending threshold value #OP23. More specifically, it is set to an output power (specifically, 2.0 PS) of about 44% of the full-throttle output power produced when the engine speed NE is at the third desired speed NED3.

When the determination is negative in S50, the rest of the program is skipped and the third desired speed NED3 is maintained. On the other hand, when the determination is positive in S50, the program advances to S52, and it is similarly determined whether the condition that the engine output power OP is less than the second descending threshold value #OP32 continues over the duration of the second predetermined time period t2 or more.

When the determination is negative in S52, the rest of the process is skipped and the third desired speed NED3 is maintained. When the determination is positive in S52, the program advances to S54, and the desired speed NED is changed (reduced) to the second desired speed NED2, as shown by the dotted line in FIG. 8.

When the determination is negative in S42 in the flowchart in FIG. 4 (specifically, when the desired speed NED is set to the fourth desired speed NED4), the program advances to S56 in the flowchart in FIG. 5, and it is determined whether the engine output power OP is less than a third descending threshold value #OP43; in other words, whether the load acting on the snow removal mechanism 30 or travel mechanism 42 is less than the large load described above. The third descending threshold value #OP43 is set to a value less than the third ascending threshold value #OP34. More specifically, the value is set to an output power (specifically, 3.0 PS) of about 64% of the full-throttle output power produced when the engine speed NE is at the fourth desired speed NED4.

When the determination is negative in S56, the rest of the process is skipped and the fourth desired speed NED4 is maintained. On the other hand, when the determination is positive in S56, the program advances to S58, and it is similarly determined whether the condition that the engine output OP is less than the third descending threshold value #OP43 continues over the duration of the second predetermined time period t2 or more.

When the determination is negative in S58, the rest of the process is skipped and the fourth desired speed NED4 is maintained. When the determination is positive in S58, the program advances to S60 and the desired speed NED is changed (reduced) to the third desired speed NED3, as shown by the dotted line in FIG. 8.

Thus, in this embodiment, the engine speed NE is controlled at the desired speed NED by driving the throttle valve 94 with the electric motor 96, the engine output power OP corresponding to the load acting on the snow removal mechanism 30 or travel mechanism 42 is estimated on the basis of the throttle position θTH and the engine speed NE, and the desired speed NED is increased to a higher value when the estimated engine output power OP exceeds the first through third ascending threshold values #OP12, #OP23, and #OP34. Accordingly, the engine speed NE maintained when a small load is acting on the snow removal mechanism 30 or travel mechanism 42 can be set to a lower value, whereby the noise level can be reduced and fuel efficiency improved compared with the prior art wherein a mechanical governor is used to adjust the engine speed.

Furthermore, since there is no need to manually adjust the engine speed NE, the operation can be simplified and load generating operations such as snow removal and driving can be performed in a stable manner.

Since the desired speed NED is reduced to a lower value when the engine output power OP is less than the first through third descending threshold values #OP21, #OP32, and #OP43, the engine speed NE can be quickly reduced when the generated load is reduced, and the noise level can therefore be more effectively reduced and fuel efficiency improved. Furthermore, since the descending threshold values #OP21, #OP32, and #OP43 are set to values less than the corresponding ascending threshold values #OP12, #OP23, and #OP34, the desired speed NED can be prevented from frequently switching (control hunting can be prevented), whereby the load generating operations can be performed in a more stable manner.

Also, the desired speed NED is increased when the engine output power OP exceeds the ascending threshold values #OP12, #OP23, and #OP34 over the duration of the first predetermined time period t1 or more, and the desired speed NED is reduced when the engine output power OP is less than the descending threshold values #OP21, #OP32, and #OP43 over the duration of the second predetermined time period t2 or more. Accordingly, the desired speed NED does not change, and the load generating operations can thereby be performed in an even more stable manner even when temporary load fluctuations occur due to fuel buildup or the like.

Since the desired speed NED is increased or reduced stepwise or in stages (in four stages) by providing a plurality (three) of both the ascending threshold values and the descending threshold values and switching among these values in accordance with the desired speed NED, the desired speed NED can be set to a more appropriate value according to the generated load, and the load generating operations can therefore be performed in an even more stable manner.

Since the desired speed NED is increased up to upper limit of, i.e., determined by the maximum output power generating speed (the fourth desired speed NED4) of the engine 22, the engine output power OP can be maximized when the generated load is the highest, and the load generating operations can therefore be performed in an even more stable manner.

Thus, the embodiment is configured to have a system for controlling a speed of an internal combustion engine 22 mounted on a snow remover 10 having a snow removal mechanism 30 and a travel mechanism 42 to drive at least one of the snow removal mechanism and travel mechanism, comprising: an actuator (electric motor 96) connected to a throttle valve 94 of the engine to move the throttle valve; an engine speed sensor (crank angle sensor) 100 detecting speed NE of the engine; a throttle position sensor 98 detecting position of the throttle valve; an engine speed controller (ECU 102) controlling operation of the actuator such that the speed of the engine becomes equal to a desired engine speed NED; a load estimator (ECU 102, S18) estimating load (more specifically, engine output power OP indicative of the load) acting on at least one of the snow removal mechanism and travel mechanism based on the detected speed of the engine and position of the throttle valve; and a desired engine speed changer (ECU 102, S22, S26, S30, S34, S44, S48) changing the desired engine speed NED to increase when the estimated load exceeds an ascending threshold value #OP12, #OP23, #OP34. In the system, the desired engine speed changer changes the desired engine speed to decrease when the estimated load is less than a descending threshold value #OP21, #OP32, #OP43 set lower than the ascending threshold value (ECU 102, S36, S40, S50, S54, S56, S60).

More specifically, the desired engine speed changer changes the desired engine speed NED to increase when a condition that the estimated load exceeds the ascending threshold value for a first predetermined time period t1 (ECU 102, S24, S26, S32, S34, S46, S48), and changes the desired engine speed to decrease when a condition that the estimated load is less than the descending threshold value for a second predetermined time period t2 (ECU 102, S38, S40, S52, S54, S58, S60).

In the system, wherein the desired engine speed changer has a plurality of values #OP12, #OP23, #OP34 as the ascending threshold value, one of which selected in response to the changed desired engine speed NED, such that the desired engine speed is changed to increase stepwise. Similarly, the desired engine speed changer has a plurality of values #OP21, #OP32, #OP43 as the descending threshold value, one of which selected in response to the changed desired engine speed NED, such that the desired engine speed is changed to decrease stepwise.

In the system, the desired engine speed changer changes the desired engine speed to increase up to upper limit (NED4) determined by a maximum output power generating speed of the engine 22.

In the above description, although the first predetermined time period t1 and second predetermined time period t2 are both set to 1 sec, they may also be set to different values. Also, while the desired speed NED is set in four stages, the speed may also be set in three stages or less or five stages or more.

Although the desired speed NED, the predetermined time periods t1 and t2, the engine output power OP, and other such numeric values are specifically expressed, they are obviously not limited to these values.

Also, although a stepping motor is used as an actuator for opening and closing the throttle valve 94, a DC motor, a rotary solenoid, or another such actuator may also be used.

Japanese Patent Application No. 2004-007380 filed on Jan. 14, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

The invention claimed is:

1. A system for controlling a speed of an internal combustion engine mounted on a snow remover having a snow removal mechanism and a travel mechanism to drive at least one of the snow removal mechanism and travel mechanism, comprising:

an actuator connected to a throttle valve of the engine to move the throttle valve;

an engine speed sensor detecting speed of the engine;

a throttle position sensor detecting position of the throttle valve;

an engine speed controller controlling operation of the actuator such that the speed of the engine becomes equal to a desired engine speed;

a load estimator estimating load acting on at least one of the snow removal mechanism and travel mechanism based on the detected speed of the engine and position of the throttle valve; and a desired engine speed changer changing the desired engine speed to increase when the estimated load exceeds an ascending threshold value.

2. The system according to claim 1, wherein the desired engine speed changer changes the desired engine speed to decrease when the estimated load is less than a descending threshold value set lower than the ascending threshold value.

3. The system according to claim 2, wherein the desired engine speed changer changes the desired engine speed to decrease when the estimated load is less than the descending threshold value for a predetermined time period.

4. The system according to claim 2, wherein the desired engine speed changer has a plurality of values as the descending threshold value, one of which is selected in response to the changed desired engine speed, such that the desired engine speed is changed to decrease stepwise.

5. The system according to claim 1, wherein the desired engine speed changer changes the desired engine speed to increase when the estimated load exceeds the ascending threshold value for a first predetermined time period.

6. The system according to claim 5, wherein the desired engine speed changer changes the desired engine speed to decrease when the estimated load is less than the descending threshold value for a second predetermined time period.

7. The system according to claim 1, wherein the desired engine speed changer has a plurality of values as the ascending threshold value, one of which is selected in response to the changed desired engine speed, such that the desired engine speed is changed to increase stepwise.

8. The system according to claim 1, wherein the desired engine speed changer changes the desired engine speed to increase up to an upper limit determined by a maximum output power generating speed of the engine.

9. A method of controlling a speed of an internal combustion engine mounted on a snow remover having a snow removal mechanism and a travel mechanism to drive at least one of the snow removal mechanism and travel mechanism and an actuator connected to a throttle valve of the engine to move the throttle valve, comprising the steps of:

detecting speed of the engine;

detecting position of the throttle valve;

controlling operation of the actuator such that the speed of the engine becomes equal to a desired engine speed;

estimating load acting on at least one of the snow removal mechanism and travel mechanism based on the detected speed of the engine and position of the throttle valve; and changing the desired engine speed to increase when the estimated load exceeds an ascending threshold value.

10. The method according to claim 9, wherein the step of desired engine speed changing changes the desired engine speed to decrease when the estimated load is less than a descending threshold value set lower than the ascending threshold value.

11. The method according to claim 10, wherein the step of desired engine speed changing changes the desired engine speed to decrease when the estimated load is less than the descending threshold value for a predetermined time period.

12. The method according to claim 10, wherein the step of desired engine speed changing has a plurality of values as the descending threshold value, one of which is selected in response to the changed desired engine speed, such that the desired engine speed is changed to decrease stepwise.

13. The method according to claim 9, wherein the step of desired engine speed changing changes the desired engine speed to increase when the estimated load exceeds the ascending threshold value for a first predetermined time period.

14. The method according to claim 13, wherein the step of desired engine speed changing changes the desired engine speed to decrease when the estimated load is less than the descending threshold value for a second predetermined time period.

15. The method according to claim 9, wherein the step of desired engine speed changing has a plurality of values as the ascending threshold value, one of which is selected in response to the changed desired engine speed, such that the desired engine speed is changed to increase stepwise.

16. The method according to claim 9, wherein the step of desired engine speed changing changes the desired engine speed to increase up to an upper limit determined by a maximum output power generating speed of the engine.

* * * * *